(No Model.)

W. J. McELROY & T. J. McTIGHE.
TRANSFORMATION AND DISTRIBUTION OF ELECTRICAL ENERGY.

No. 393,073. Patented Nov. 20, 1888.

WITNESSES:
E. Myers,
S. Field,

William J. McElroy
Thomas J. McTighe } INVENTORS,

BY
McTighe & Worthington
ATTORNEYS.

N. PETERS, Photo-Lithographer, Washington, D. C.

UNITED STATES PATENT OFFICE.

WILLIAM J. McELROY, OF PITTSBURG, PENNSYLVANIA, AND THOMAS J. McTIGHE, OF NEW YORK, N. Y.

TRANSFORMATION AND DISTRIBUTION OF ELECTRICAL ENERGY.

SPECIFICATION forming part of Letters Patent No. 393,073, dated November 20, 1888.

Application filed March 12, 1888. Serial No. 267,200. (No model.)

*To all whom it may concern:*

Be it known that we, WILLIAM J. McELROY, of Pittsburg, in the county of Allegheny, State of Pennsylvania, and THOMAS J. Mc-TIGHE, residing at New York, in the county of New York, and State of New York, both citizens of the United States, have invented certain new and useful Improvements in the Transformation and Distribution of Electrical Energy; and we do hereby declare the following to be a full, clear, and exact description of the invention, such as will enable others skilled in the art to which it appertains to make and use the same.

This invention relates to the transformation and distribution of electrical energy, and has reference especially to a system of distribution from high potential on the main or distributing line to currents of low potential in the consumption circuits or lines.

The invention consists in the peculiar arrangements and combinations, and the construction of devices forming the system, all substantially as hereinafter described and claimed.

Figure 1:
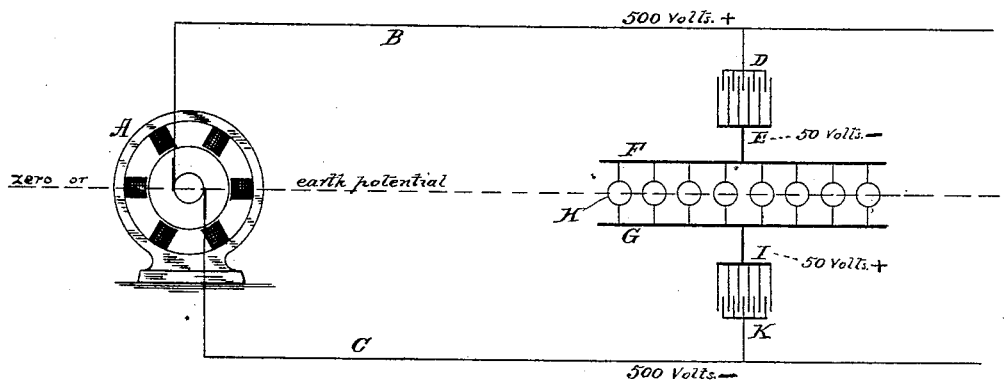
Figure 2:
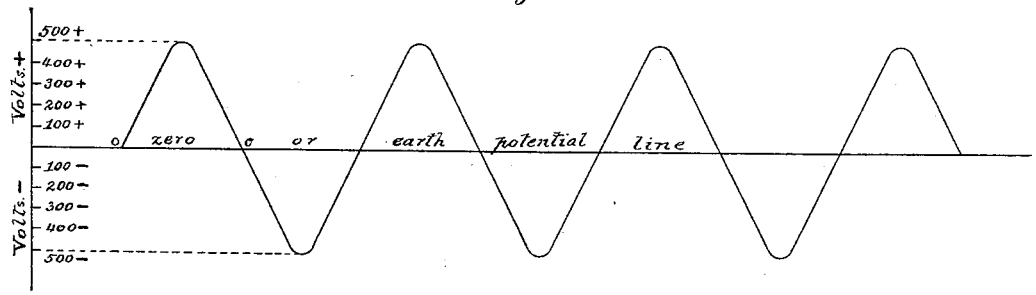
Figure 3:
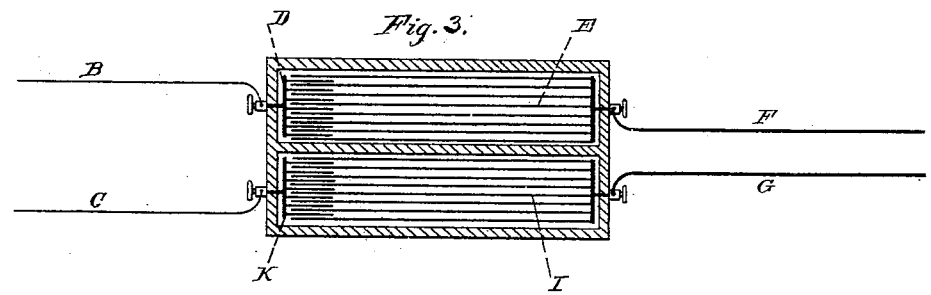

In the drawings, forming part of this specification, Figure 1 is a diagram clearly illustrating our system and the mode of carrying our invention into effect for the purpose of electric lighting. Fig. 2 is a diagram showing phases of an alternating current. Fig. 3 is a section of a double condenser in one construction.

Referring to Fig. 2, we see that the difference of potential may be said to be the sum of the potential above and that below a line drawn horizontally at a point midway between the highest and lowest phases of the curve. This line we consider as the line of equilibrium, or line of no potential, or line of earth potential, and at a definite point in each wavelength representing the potential this zero or earth-potential line is cut by said curve, and at each such point of course there is no potential and consequently it is reasonable to say that at the times of no potential thus considered there is no current flowing on the main line or through the generator. Keeping this in mind, and referring now to Fig. 1, we may say that the total difference of potential existing between line B and line C may be expressed by stating that line B is at a tension of so many volts above earth potential and line C is at a tension the same number of volts below earth potential; or, using figures, the total difference of potential between B and C is one thousand volts, B being five hundred volts above and C five hundred volts below the zero line or earth potential.

With this explanation we proceed to describe the application of our invention. At a suitable point in line B we take a branch to the plate or plates D of an electrostatic condenser, and in inductive proximity to the plate or plates D we place the plate or plates E, of larger surface area, the proportion in this case being D : E : : 1 : 10. From the plate or plates E extends one side of the lamp branch F, between which and the branch G we wire the lamps H in the usual manner.

We connect G to the plate or plates I of another electrostatic condenser having inductive proximity thereto the plate or plates K, which in turn are connected to the line C or main. The condenser I K is made up in the same manner or proportions as to surface area as the condenser D E, and like it has its smaller plate or plates connected to the main line C. The two condensers D E and I K thus occupy the same relations to their respective mains B and C; but with respect to each other their relations are inverted—that is, the large plates of both are connected together through the lamps F and branches F G.

The operation is considered to be as follows: The alternation-current generator A being in motion produces an alternating current—as, for example, of the character shown in Fig. 2—and alternately charges both sides of the line with a potential of five hundred volts above and below the zero or earth-potential line, which we have introduced as a dotted line in Fig. 1, (which, however, is not to be considered as a circuit in any sense.) Beginning with zero-point, the potential rises in B to its maximum—five hundred volts—and charges the plates D to the same extent, after which the potential falls again to zero-line and passes beyond it, rising in line C to five hundred volts, as it were, in the other direction, or below the zero or earth-potential line. Considering the plates D charged with five hundred volts positive potential, the portions of plates E opposite them are inductively charged with a potential of five hundred volts negative. Now when the potential in B falls to the zero-line the charge on plates E spreads over the entire surface of the said plates, and its potential falls in proportion as it spreads. The proportion, as stated, being one to ten, the potential now existing on plates E is fifty volts negative. When the potential on line C is five hundred volts negative, plates K are charged with the same tension in the same sign or negative, and plates I are inductively charged with the same potential in the opposite sign or positive. Now when the potential in C goes back to zero again the charge on plates I is released and spreads over their surface, and on account of the proportion already given the potential on plates I is now fifty volts positive. At this moment the charges of fifty volts negative on plates E and fifty volts positive on plates I unite through the lamps H and the electrical energy disappears in the heating of the filaments and production of light. The rapid alternations of potential in B and C make continuous illumination, just as if the lamps were fed directly from the mains B and C. In the case illustrated the total difference of potential between the lines B and C being one thousand volts, and the proportions between the respective plates of the condensers being as one to ten, the potential existing between the conductors F and G is in the same proportion substantially—namely, one-tenth of the total difference of potential, or about one hundred volts.

Obviously the difference of potential between the consumption-conductors F and G can be made greater or less to any extent, as desired, the resulting potential being dependent upon the proportions existing between the surface area of the two members of the condensers. By extending the mains B and C any number of such groups of transformers or converters, as illustrated in Fig. 1, may be introduced, and thus the system is capable of great flexibility and adaptation to varying circumstances. The various groups of transforming-condensers placed between B and C may be of respectively different characters in regard to the voltage given the consumption devices.

It would seem that in all cases there should be an equality in size and proportion between the condensers D E and the condensers I K.

For the sake of convenience in handling and to avoid taking up unnecessary room, the double condensers D E and I K may be constructed together, as indicated in Fig. 3, which shows a plan section of a box containing four sets of plates and the manner of connecting the low-potential plates to the lamp-circuit.

We claim as our invention—

In a system of transformation or conversion of electrical energy, the combination of an alternating-current generator, a pair of mains respectively connected to the terminals thereof, two electrostatic converters, and consumption devices, said converters being composed each of two members of different area, the smaller members being respectively joined to said mains and the larger members connected to said consumption devices, substantially as described.

In testimony whereof we affix our signatures in presence of two witnesses.

WILLIAM J. McELROY.
THOMAS J. McTIGHE.

Witnesses:
EDITH D. MYERS,
SADIE E. FIELD.